(12) United States Patent
Padbidri et al.

(10) Patent No.: US 11,714,824 B2
(45) Date of Patent: Aug. 1, 2023

(54) SYSTEM AND METHOD FOR ENABLING ETL (EXTRACT-TRANSFORM-LOAD) AS A SERVICE

(71) Applicant: JPMorgan Chase Bank, N.A., New York, NY (US)

(72) Inventors: Prashanth Madhav Padbidri, Hyderabad (IN); Sidhartha Sinha, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 72 days.

(21) Appl. No.: 17/444,504

(22) Filed: Aug. 5, 2021

(65) Prior Publication Data
US 2022/0405294 A1    Dec. 22, 2022

(30) Foreign Application Priority Data
Jun. 19, 2021    (IN) .............................. 202111027527

(51) Int. Cl.
*G06F 16/00* (2019.01)
*G06F 16/25* (2019.01)
*H04L 67/104* (2022.01)

(52) U.S. Cl.
CPC .......... *G06F 16/254* (2019.01); *G06F 16/252* (2019.01); *H04L 67/104* (2013.01)

(58) Field of Classification Search
CPC ..... G06F 16/254; G06F 16/252; H04L 67/104
See application file for complete search history.

(56) References Cited
U.S. PATENT DOCUMENTS

2011/0295795 A1* 12/2011 Venkatasubramanian ..................
G06F 16/254
707/602
2022/0129474 A1* 4/2022 Maduri ............. G06F 16/24554

* cited by examiner

*Primary Examiner* — Tyler J Torgrimson
(74) *Attorney, Agent, or Firm* — Greenblum & Bernstein, P.L.C.

(57) ABSTRACT

A system and method for enabling ETL (Extract-Transform-Load) as a service for data processing are disclosed. A user interface (UI) platform includes an input interface layer and an output interface layer. A receiver receives user input, via the input interface layer, of configuration details data corresponding to a desired data to be fetched from one or more data sources. A processor fetches the desired data from said one or more data sources based on the configuration details data to be utilized for the desired data processing scheme; automatically implements a transformation algorithm on the desired data corresponding to the configuration details data and the desired data processing scheme to output a transformed data in a predefined format; and transmits, via the output interface layer, the transformed data to downstream applications or systems in an end-to-end pipeline.

12 Claims, 7 Drawing Sheets

SYSTEM AND METHOD FOR ENABLING ETL (EXTRACT-TRANSFORM-LOAD) AS A SERVICE

CROSS-REFERENCE TO RELATED APPLICATIONS

This application claims the benefit of priority from Provisional Patent Application No. 202111027527, filed Jun. 19, 2021, which is herein incorporated by reference in its entirety.

TECHNICAL FIELD

This disclosure generally relates to data processing and data engineering, and, more particularly, to methods and apparatuses for implementing an ETL (extract-transform-load) platform that serves as a cloud based alternative to traditional ETL/ELT (extract-load-transform) tools.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Today, most data distribution ETL solution has been created using AbInitio. AbInitio is not an open source solution and hence involves significant license cost while also requiring dedicated infrastructure for execution. AbInitio is also not cloud native and may require additional adapters/plug-ins along with additional effort to develop and integrate into a CI/CD (continuous integration/continuous delivery) pipeline. In addition, AbInitio is a niche skill presenting serious staffing and resourcing challenges with very high average lead times for staffing new team members and making a new team member productive.

SUMMARY

The present disclosure, through one or more of its various aspects, embodiments, and/or specific features or sub-components, provides, among other features, various systems, servers, devices, methods, media, programs, and platforms for implementing a cloud native ETL module that serves as a cloud based alternative to traditional ETL/ELT tools provides ETL as a service for any potential end-user that possesses SQL (Structured Query Language) knowledge without the need to learn any other advanced programming languages or concepts, but the disclosure is not limited thereto.

According to an aspect of the present disclosure, a method for enabling ETL (Extract-Transform-Load) as a service for data processing by utilizing one or more processors and one or more memories is disclosed. The method may include: implementing a user interface (UI) platform that is configured for enabling ETL as a service for a desired data processing scheme, the UI platform including an input interface layer and an output interface layer; receiving user input, via the input interface layer, of configuration details data corresponding to a desired data to be fetched from one or more data sources; fetching the desired data from said one or more data sources based on the configuration details data to be utilized for the desired data processing scheme; automatically implementing a transformation algorithm on the desired data corresponding to the configuration details data and the desired data processing scheme to output a transformed data in a predefined format; and transmitting, via the output interface layer, the transformed data to downstream applications or systems in an end-to-end pipeline.

According to another aspect of the present disclosure, the data processing scheme may include one or more of the processing schemes: real time data processing, stream data processing, and batch data processing, but the disclosure is not limited thereto.

According to yet another aspect of the present disclosure, wherein in real time data processing, prior to transmitting the transformed data to downstream applications or systems, the method may further implement one or more of the following processes to the fetched desired data: applying data augmentation or data enhancement algorithm; applying data normalization or data standardization algorithm; applying data validation algorithm; and applying business rules, but the disclosure is not limited thereto.

According to another aspect of the present disclosure, wherein in stream data processing, prior to transmitting the transformed data to downstream applications or systems, the method may further implement one or more of the following processes to the fetched desired data: applying data aggregation, statistical calculations, and metrics computation algorithms over a predefined timed window; and applying micro-batching algorithm based on a predefined time or a predefined rate interval, but the disclosure is not limited thereto.

According to a further aspect of the present disclosure, wherein in batch data processing, prior to transmitting the transformed data to downstream applications or systems, the method may further implement one or more of the following processes to the fetched desired data: applying data extraction, data transform, and data load algorithms; and applying database or schema migration algorithm, but the disclosure is not limited thereto.

According to yet another aspect of the present disclosure, the method may further include: identifying upstream applications or systems in the end-to-end pipeline that have moved onto a real time processing mode from a batch processing mode; identifying downstream applications or systems that are still working in a batch processing mode; and implementing a common configuration for interfacing the identified upstream applications or systems with the identified downstream applications or systems in a manner such that overall end-to-end pipeline remains intact during ETL.

According to a further aspect of the present disclosure, the method may further include implementing a common code base for executing ETL across both the batch processing mode and the real time processing mode.

According to another aspect of the present disclosure, a system for enabling ETL (Extract-Transform-Load) as a service for data processing is disclosed. The system may include: a processor; and a memory operatively connected to the processor via a communication interface, the memory storing computer readable instructions, when executed, causes the processor to: implement a user interface (UI) platform that is configured for enabling ETL as a service for a desired data processing scheme, the UI platform including an input interface layer and an output interface layer; receive user input, via the input interface layer, of configuration details data corresponding to a desired data to be fetched from one or more data sources; fetch the desired data from said one or more data sources based on the configuration details data to be utilized for the desired data processing scheme; automatically implement a transformation algorithm on the desired data corresponding to the configuration details data and the desired data processing scheme to output a transformed data in a predefined format; and transmit, via the output interface layer, the transformed data to downstream applications or systems in an end-to-end pipeline.

According to a further aspect of the present disclosure, wherein in real time data processing, prior to transmitting the transformed data to downstream applications or systems, the processor may be further configured to implement one or more of the following processes to the fetched desired data: apply data augmentation or data enhancement algorithm; apply data normalization or data standardization algorithm; apply data validation algorithm; and apply business rules, but the disclosure is not limited thereto.

According to another aspect of the present disclosure, wherein in stream data processing, prior to transmitting the transformed data to downstream applications or systems, the processor may be further configured to implement one or more of the following processes to the fetched desired data: apply data aggregation, statistical calculations, and metrics computation algorithms over a predefined timed window; and apply micro-batching algorithm based on a predefined time or a predefined rate interval, but the disclosure is not limited thereto.

According to a further aspect of the present disclosure, wherein in batch data processing, prior to transmitting the transformed data to downstream applications or systems, the processor may be further configured to implement one or more of the following processes to the fetched desired data: apply data extraction, data transform, and data load algorithms; and apply database or schema migration algorithm, but the disclosure is not limited thereto.

According to yet another aspect of the present disclosure, the processor may be further configured to: identify upstream applications or systems in the end-to-end pipeline that have moved onto a real time processing mode from a batch processing mode; identify downstream applications or systems that are still working in a batch processing mode; and implement a common configuration for interfacing the identified upstream applications or systems with the identified downstream applications or systems in a manner such that overall end-to-end pipeline remains intact during ETL.

According to a further aspect of the present disclosure, the processor may be further configured to implement a common code base for executing ETL across both the batch processing mode and the real time processing mode.

According to yet another aspect of the present disclosure, a non-transitory computer readable medium configured to store instructions for enabling ETL (Extract-Transform-Load) as a service for data processing is disclosed. The instructions, when executed, may cause a processor to perform the following: implementing a user interface (UI) platform that is configured for enabling ETL as a service for a desired data processing scheme, the UI platform including an input interface layer and an output interface layer; receiving user input, via the input interface layer, of configuration details data corresponding to a desired data to be fetched from one or more data sources; fetching the desired data from said one or more data sources based on the configuration details data to be utilized for the desired data processing scheme; automatically implementing a transformation algorithm on the desired data corresponding to the configuration details data and the desired data processing scheme to output a transformed data in a predefined format; and transmitting, via the output interface layer, the transformed data to downstream applications or systems in an end-to-end pipeline.

According to yet another aspect of the present disclosure, wherein in real time data processing, prior to transmitting the transformed data to downstream applications or systems, the instructions, when executed, may cause the processor to further implement one or more of the following processes to the fetched desired data: applying data augmentation or data enhancement algorithm; applying data normalization or data standardization algorithm; applying data validation algorithm; and applying business rules, but the disclosure is not limited thereto.

According to another aspect of the present disclosure, wherein in stream data processing, prior to transmitting the transformed data to downstream applications or systems, the instructions, when executed, may cause the processor to further implement one or more of the following processes to the fetched desired data: applying data aggregation, statistical calculations, and metrics computation algorithms over a predefined timed window; and applying micro-batching algorithm based on a predefined time or a predefined rate interval, but the disclosure is not limited thereto.

According to a further aspect of the present disclosure, wherein in batch data processing, prior to transmitting the transformed data to downstream applications or systems, the instructions, when executed, may cause the processor to further implement one or more of the following processes to the fetched desired data: applying data extraction, data transform, and data load algorithms; and applying database or schema migration algorithm, but the disclosure is not limited thereto.

According to yet another aspect of the present disclosure, the instructions, when executed, may cause the processor to further perform the following: identifying upstream applications or systems in the end-to-end pipeline that have moved onto a real time processing mode from a batch processing mode; identifying downstream applications or systems that are still working in a batch processing mode; and implementing a common configuration for interfacing the identified upstream applications or systems with the identified downstream applications or systems in a manner such that overall end-to-end pipeline remains intact during ETL.

According to a further aspect of the present disclosure, the instructions, when executed, may cause the processor to further implement a common code base for executing ETL across both the batch processing mode and the real time processing mode.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
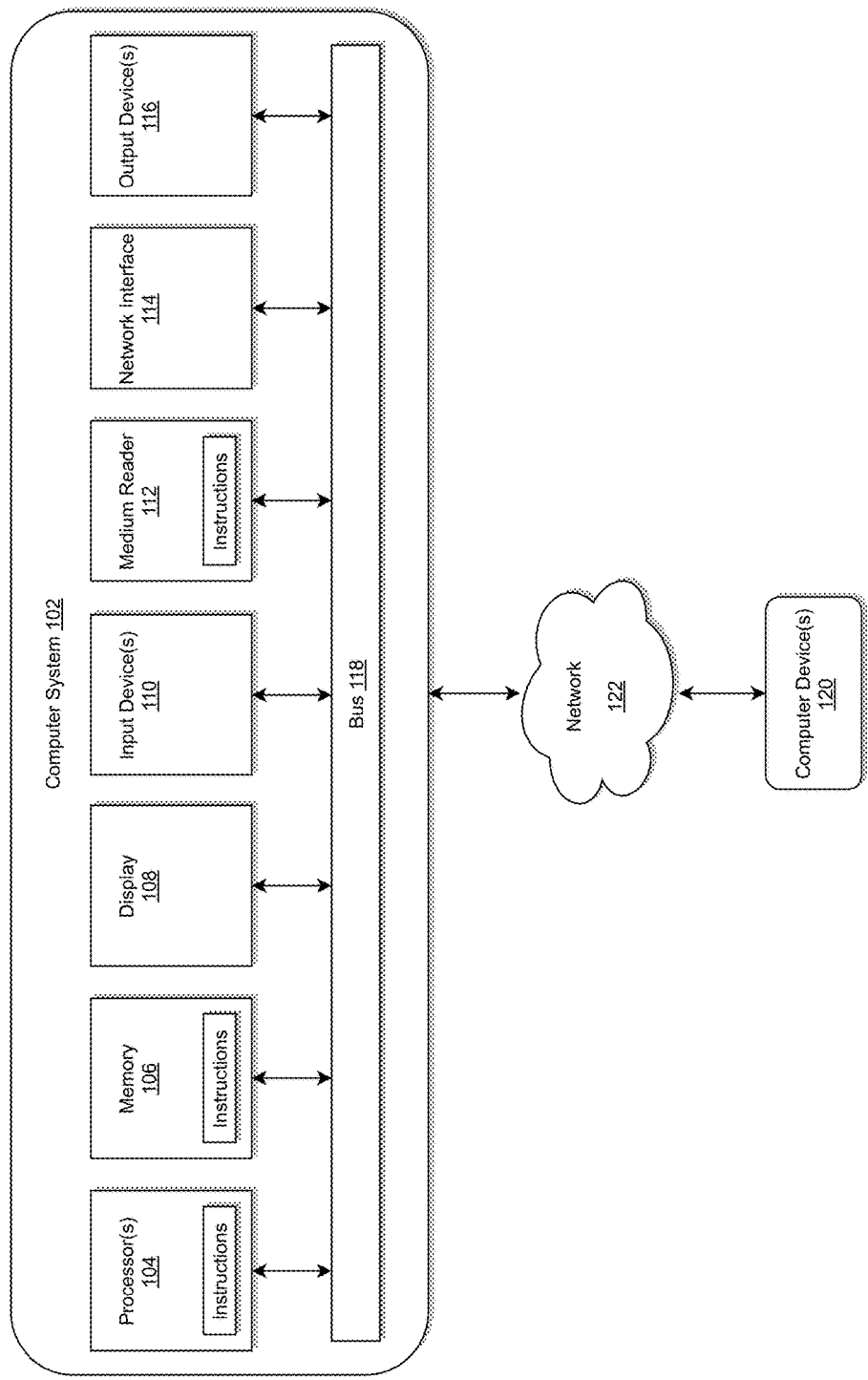
FIG. 1 illustrates a computer system for implementing a cloud native ETL module for enabling ETL as a service for data processing in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a cloud native ETL module for enabling ETL as a service for data processing in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
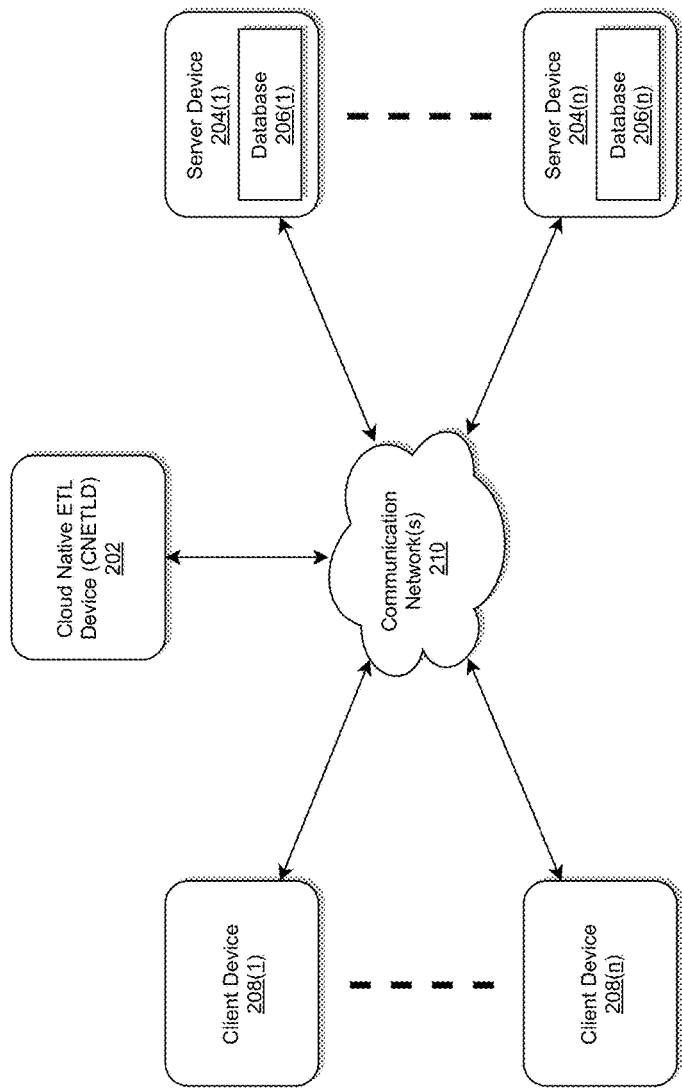
FIG. 2 illustrates an exemplary diagram of a network environment with a cloud native ETL device in accordance with an exemplary embodiment.

Referring to FIG. 2, a schematic of an exemplary network environment 200 for implementing a cloud native ETL device (CNETLD) of the instant disclosure is illustrated.

According to exemplary embodiments, the above-described problems associated with conventional approach may be overcome by implementing a CNETLD 202 as illustrated in FIG. 2 that may provide a platform for implementing a cloud native ETL module that serves as a cloud based alternative to traditional ETL/ELT tools provides ETL as a service for any potential end-user that possesses SQL knowledge without the need to learn any other advanced programming languages or concepts, but the disclosure is not limited thereto.

The CNETLD 202 may be the same or similar to the computer system 102 as described with respect to FIG. 1.

The CNETLD 202 may store one or more applications that can include executable instructions that, when executed by the CNETLD 202, cause the CNETLD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CNETLD 202 itself, may be located in virtual server(s) running in a cloud-based computing environment rather than being tied to one or more specific physical network computing devices. Also, the application(s) may be running in one or more virtual machines (VMs) executing on the CNETLD 202. Additionally, in one or more embodiments of this technology, virtual machine(s) running on the CNETLD 202 may be managed or supervised by a hypervisor.

In the network environment 200 of FIG. 2, the CNETLD 202 is coupled to a plurality of server devices 204(1)-204(n) that hosts a plurality of databases 206(1)-206(n), and also to a plurality of client devices 208(1)-208(n) via communication network(s) 210. A communication interface of the CNETLD 202, such as the network interface 114 of the computer system 102 of FIG. 1, operatively couples and communicates between the CNETLD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CNETLD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CNETLD 202 may be a standalone device or integrated with one or more other devices or apparatuses, such as one or more of the server devices 204(1)-204(n), for example. In one particular example, the CNETLD 202 may be hosted by one of the server devices 204(1)-204(n), and other arrangements are also possible. Moreover, one or more of the devices of the CNETLD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CNETLD 202 via the communication network(s) 210 according to the HTTP-based and/or JavaScript Object Notation (JSON) protocol, for example, although other protocols may also be used. According to a further aspect of the present disclosure, wherein the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the CNETLD 202 that may efficiently provide a platform for implementing a cloud native ETL module that serves as a cloud based alternative to traditional ETL/ELT tools provides ETL as a service for any potential end-user that possesses SQL knowledge without the need to learn any other advanced programming languages or concepts, but the disclosure is not limited thereto.

The client devices 208(1)-208(n) may run interface applications, such as standard web browsers or standalone client applications, which may provide an interface to communicate with the CNETLD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the CNETLD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CNETLD 202, the server devices 204(1)-204(n), or the client devices 208(1)-208(n), for example, may be configured to operate as virtual instances on the same physical machine. For example, one or more of the CNETLD 202, the server devices 204(1)-204(n), or the client devices 208(1)-208(n) may operate on the same physical device rather than as separate devices communicating through communication network(s) 210. Additionally, there may be more or fewer CNETLDs 202, server devices 204(1)-204(n), or client devices 208(1)-208(n) than illustrated in FIG. 2. According to exemplary embodiments, the CNETLD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
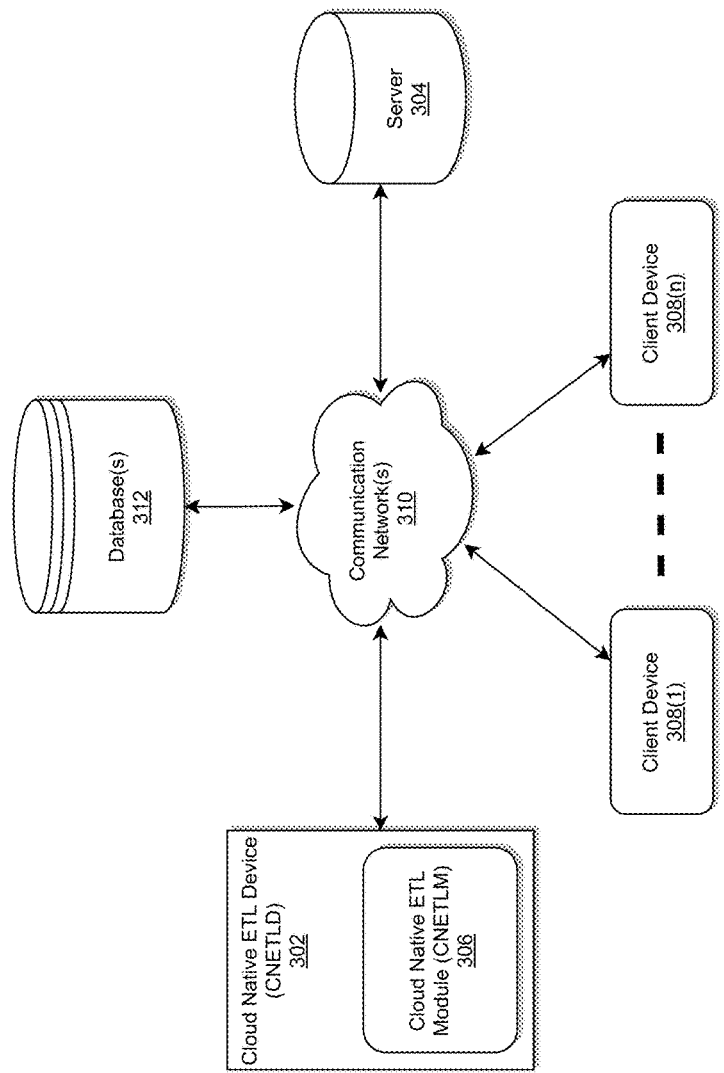
FIG. 3 illustrates a system diagram for implementing a cloud native ETL device with a cloud native ETL module in accordance with an exemplary embodiment.

FIG. 3 illustrates a system diagram for implementing a CNETLD having a cloud native ETL module (CNETLM) in accordance with an exemplary embodiment.

As illustrated in FIG. 3, the system 300 may include a CNETLD 302 within which a CNETLM 306 is embedded, a server 304, a database(s) 312, a plurality of client devices 308(1) ... 308(n), and a communication network 310.

According to exemplary embodiments, the CNETLD 302 including the CNETLM 306 may be connected to the server 304, and the database(s) 312 via the communication network 310. Although there is only one database has been illustrated, the disclosure is not limited thereto. Any number of databases may be utilized. The CNETLD 302 may also be connected to the plurality of client devices 308(1) ... 308(n) via the communication network 310, but the disclosure is not limited thereto.

According to exemplary embodiment, the CNETLD 302 is described and shown in FIG. 3 as including the CNETLM 306, although it may include other rules, policies, modules, databases, or applications, for example. According to exemplary embodiments, the database(s) 312 may be embedded within the CNETLD 302. According to exemplary embodiments, the database(s) 312 may be configured to store configuration details data corresponding to a desired data to be fetched from one or more data sources, user information data etc., but the disclosure is not limited thereto.

According to exemplary embodiments, the CNETLM 306 may be configured to receive real-time feed of data from the plurality of client devices 308(1) ... 308(n) via the communication network 310.

According to exemplary embodiments, as will be described below, the CNETLM 306 may be configured to implement a user interface (UI) platform that is configured for enabling ETL as a service for a desired data processing scheme, the UI platform including an input interface layer and an output interface layer; receive user input, via the input interface layer, of configuration details data corresponding to a desired data to be fetched from one or more data sources; fetch the desired data from said one or more data sources based on the configuration details data to be utilized for the desired data processing scheme; automatically implement a transformation algorithm on the desired data corresponding to the configuration details data and the desired data processing scheme to output a transformed data in a predefined format; and transmit, via the output interface layer, the transformed data to downstream applications or systems in an end-to-end pipeline, but the disclosure is not limited thereto.

The plurality of client devices 308(1) ... 308(n) are illustrated as being in communication with the CNETLD 302. In this regard, the plurality of client devices 308(1) ... 308(n) may be "clients" of the CNETLD 302 and are described herein as such. Nevertheless, it is to be known and understood that the plurality of client devices 308(1) ... 308(n) need not necessarily be "clients" of the CNETLD 302, or any entity described in association therewith herein. Any additional or alternative relationship may exist between either or both of the plurality of client devices 308(1) ... 308(n) and the CNETLD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) ... 308(n) may communicate with the CNETLD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The CNETLD 302 may be the same or similar to the CNETLD 202 as described with respect to FIG. 2, including any features or combination of features described with respect thereto.

Figure 4:
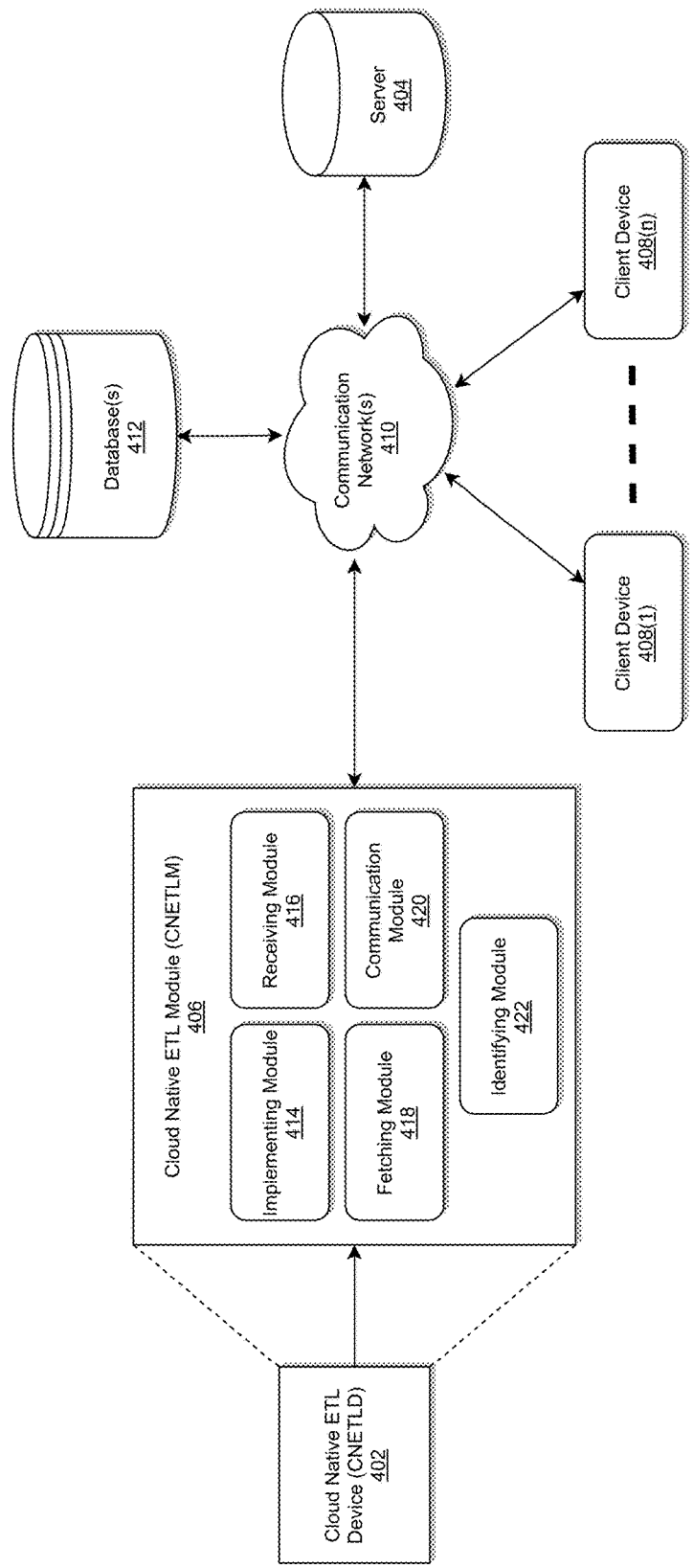
FIG. 4 illustrates a system diagram for implementing a cloud native ETL module of FIG. 3 in accordance with an exemplary embodiment.

FIG. 4 illustrates a system diagram for implementing a cloud native ETL module (CNETLM) of FIG. 3 in accordance with an exemplary embodiment.

According to exemplary embodiments, the system 400 may include a cloud native ETL device (CNETLD) 402 within which a CNETLM 406 is embedded, a server 404, a database(s) 412, and a communication network 410.

According to exemplary embodiments, the CNETLD 402 including the CNETLM 406 may be connected to the server 404, and the database(s) 412 via the communication network 410. The CNETLD 402 may also be connected to the plurality of client devices 408(1) ... 408(n) via the communication network 410, but the disclosure is not limited thereto. According to exemplary embodiments, the CNETLD 402, the CNETLM 406, the database(s) 412, the server 404, the client devices 408(1)-408(n), and the communication network 410 as illustrated in FIG. 4 may be the same or similar to the CNETLD 302, the CNETLM 306, the database(s) 312, the server 304, the client devices 308(1)-308(n), and the communication network 310, respectively, as illustrated in FIG. 3.

According to exemplary embodiments, as illustrated in FIG. 4, the CNETLM 406 may include an implementing module 414, a receiving module 416, a fetching module 418, a communication module 420, and an identifying module 422.

The process may be executed via the communication module 420 and the communication network 410, which may comprise plural networks as described above. For example, in an exemplary embodiment, the various components of the CNETLM 406 may communicate with the server 404, and the database(s) 412 via the communication module 420 and the communication network 410. Of course, these embodiments are merely exemplary and are not limiting or exhaustive.

According to exemplary embodiments, the communication network 410 and the communication module 420 may be configured to establish a link between the database(s) 412, the client devices 408(1)-408(n) and the CNETLM 406.

According to exemplary embodiments, each of the implementing module 414, receiving module 416, fetching module 418, communication module 420, and the identifying module 422 may be implemented by microprocessors or similar, they may be programmed using software (e.g., microcode) to perform various functions discussed herein and may optionally be driven by firmware and/or software. Alternatively, each of the implementing module 414, receiving module 416, fetching module 418, communication module 420, and the identifying module 422 may be implemented by dedicated hardware, or as a combination of dedicated hardware to perform some functions and a processor (e.g., one or more programmed microprocessors and associated circuitry) to perform other functions. Also, according to exemplary embodiments, each of the implementing module 414, receiving module 416, fetching module 418, communication module 420, and the identifying module 422 may be physically separated into two or more interacting and discrete blocks, units, devices, and/or modules without departing from the scope of the inventive concepts.

According to exemplary embodiments, each of the implementing module 414, receiving module 416, fetching module 418, communication module 420, and the identifying module 422 of the CNETLM 406 may be called by corresponding API, but the disclosure is not limited thereto.

Figure 5:
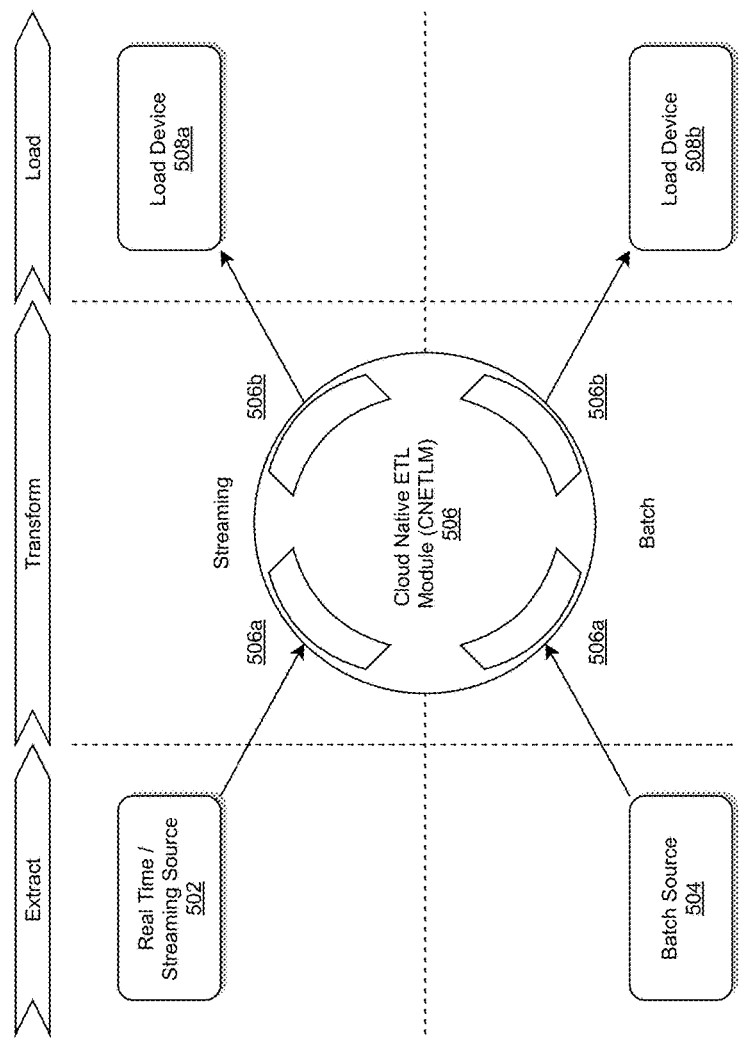
FIG. 5 illustrates an exemplary integration architecture in accordance with an exemplary embodiment.
Figure 6:
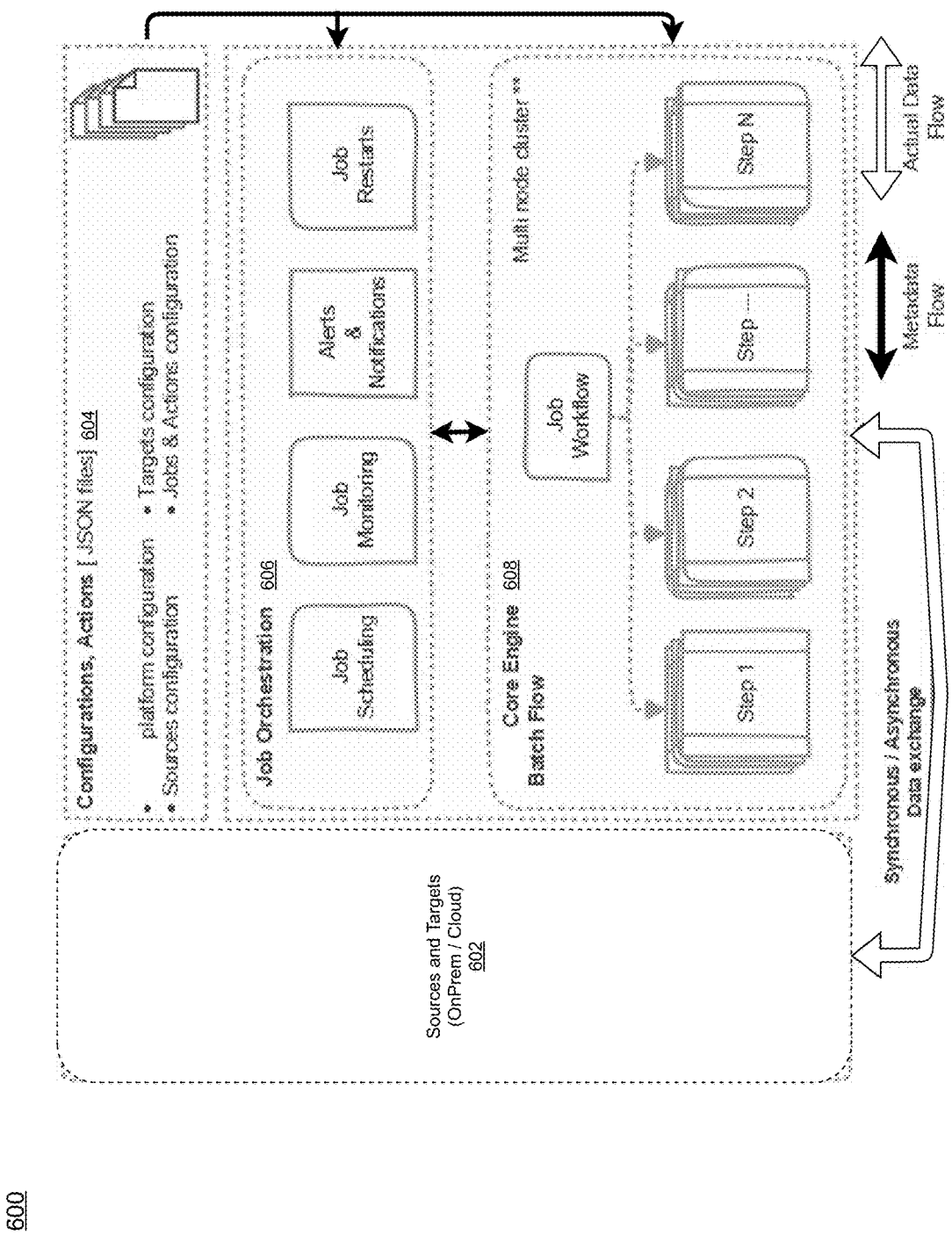
FIG. 6 illustrates another exemplary integration architecture in accordance with an exemplary embodiment.

According to exemplary embodiments, FIG. 5 illustrates an exemplary integration architecture 500 in accordance with an exemplary embodiment. FIG. 6 illustrates another exemplary integration architecture 600 in accordance with an exemplary embodiment.

Referring to FIGS. 4-6, according to exemplary embodiments, the implementing module may be configured to implement a user interface (UI) platform that is configured for enabling ETL as a service for a desired data processing scheme. The UI platform including an input interface layer 506a and an output interface layer 506b.

According to exemplary embodiments, the receiving module 416 may be configured to receive user input, via the input interface layer 506a of configuration details data corresponding to a desired data to be fetched from one or more data sources, e.g., real time/streaming source 502 and/or the batch source 504.

According to exemplary embodiments, the fetching module 418 may be configured to fetch the desired data from the one or more data sources, e.g., real time/streaming source 502 and/or the batch source 504, based on the configuration details data to be utilized for the desired data processing scheme.

According to exemplary embodiments, as illustrated in FIG. 6, sources and targets 602 can be on premises or cloud based. The integration architecture 600 of FIG. 6 may include a block 604 for configurations, actions (e.g., JSON files). The exemplary configurations, actions may include platform configuration, targets configuration, sources configuration, jobs and actions configuration, etc., but the disclosure is not limited thereto.

The integration architecture 600 of FIG. 6 may also include a block 606 for job orchestration and a block 608 for core engine and batch flow. The job orchestration block 606 may include job scheduling, job monition, alerts and notifications and job restarts, but the disclosure is not limited thereto. The block 608 may disclose job workflow in a step wise fashion, i.e., Step 1, Step 2, ... Step N. As illustrated in FIG. 6, the black solid arrow may represent metadata flow and the hollow arrow may represent actual data flow.

According to exemplary embodiments, as illustrated in FIGS. 5-6, the CNETLM 406, 506 is a platform that is created as a platform offering various features, each of which is either a 'E-read from a source', 'T-transformation specification' or 'L-output to target' action.

According to exemplary embodiments, the CNETLM 406, 506 may be configuration and action driven. For example, configurations and actions stored outside the code orchestrate the execution of an entire job workflow by calling the relevant features in a specific order to perform the appropriate Extract, Transform & Load actions (ETL actions). Configurations and actions may also orchestrate and drive the execution of jobs in a specific sequence taking into consideration the required dependencies and pre- or post-criteria.

According to exemplary embodiments, the CNETL 406, 506 may be configured to handle varied types of sources and targets. For example, the CNETL 406, 506 may support reading data from various sources and outputting data to various targets such as: various databases such as Oracle, Cockroach, Cassandra; cloud database services such as Snowflake, Hive; file types such as CSV, Parquet, EBCDIC located on local filesystem, EMRFS and cloud object stores such as S3, HDFS; SOAP and REST Webservices; messaging queue tools such as Kafka, IBM MQ, etc., but the disclosure is not limited thereto.

According to exemplary embodiments, the CNETL 406, 506 may be configured to implement partitioning, parallelism and auto-scaling processes. For example, the CNETL 406, 506 may run on AWS EMR, GKP clusters making use of Spark and Scala's innate partitioning (parallelism) feature which can be controlled through configurations. In addition, the CNETL 406, 506 may be configured to implement, where available, auto-scaling to handle workloads with varying volumes of data.

Referring back to FIGS. 4-6, according to exemplary embodiments, the implementing module 414 may be configured to automatically implement a transformation algorithm on the desired data corresponding to the configuration details data and the desired data processing scheme to output a transformed data in a predefined format. The communication module 420 may be configured to transmit, via the output interface layer 506b, the transformed data to downstream applications or systems, e.g., load device 508a, 508b, in an end-to-end pipeline.

According to exemplary embodiments, the data processing scheme may include one or more of the processing schemes: real time data processing, stream data processing, and batch data processing, but the disclosure is not limited thereto.

According to exemplary embodiments, wherein in real time data processing, prior to transmitting the transformed data to downstream applications or systems, the CNETLM 406, 506 may implement one or more of the following processes to the fetched desired data: applying data augmentation or data enhancement algorithm; applying data normalization or data standardization algorithm; applying data validation algorithm; and applying business rules, but the disclosure is not limited thereto.

According to exemplary embodiments, wherein in stream data processing, prior to transmitting the transformed data to downstream applications or systems, the CNETLM 406, 506 may further implement one or more of the following processes to the fetched desired data: applying data aggregation, statistical calculations, and metrics computation algorithms over a predefined timed window; and applying micro-batching algorithm based on a predefined time or a predefined rate interval, but the disclosure is not limited thereto.

According to exemplary embodiments, wherein in batch data processing, prior to transmitting the transformed data to downstream applications or systems, the CNETLM 406, 506 may further implement one or more of the following processes to the fetched desired data: applying data extraction, data transform, and data load algorithms; and applying database or schema migration algorithm, but the disclosure is not limited thereto.

According to exemplary embodiments, the identifying module 422 may be configured to identify upstream applications or systems in the end-to-end pipeline that have moved onto a real time processing mode from a batch processing mode and identify downstream applications or systems that are still working in a batch processing mode. The implementing module 414 may be configured to implement a common configuration for interfacing the identified upstream applications or systems with the identified downstream applications or systems in a manner such that overall end-to-end pipeline remains intact during ETL.

According to exemplary embodiments, the implementing module 414 may be further configured to implement a common code base for executing ETL across both the batch processing mode and the real time processing mode.

Figure 7:
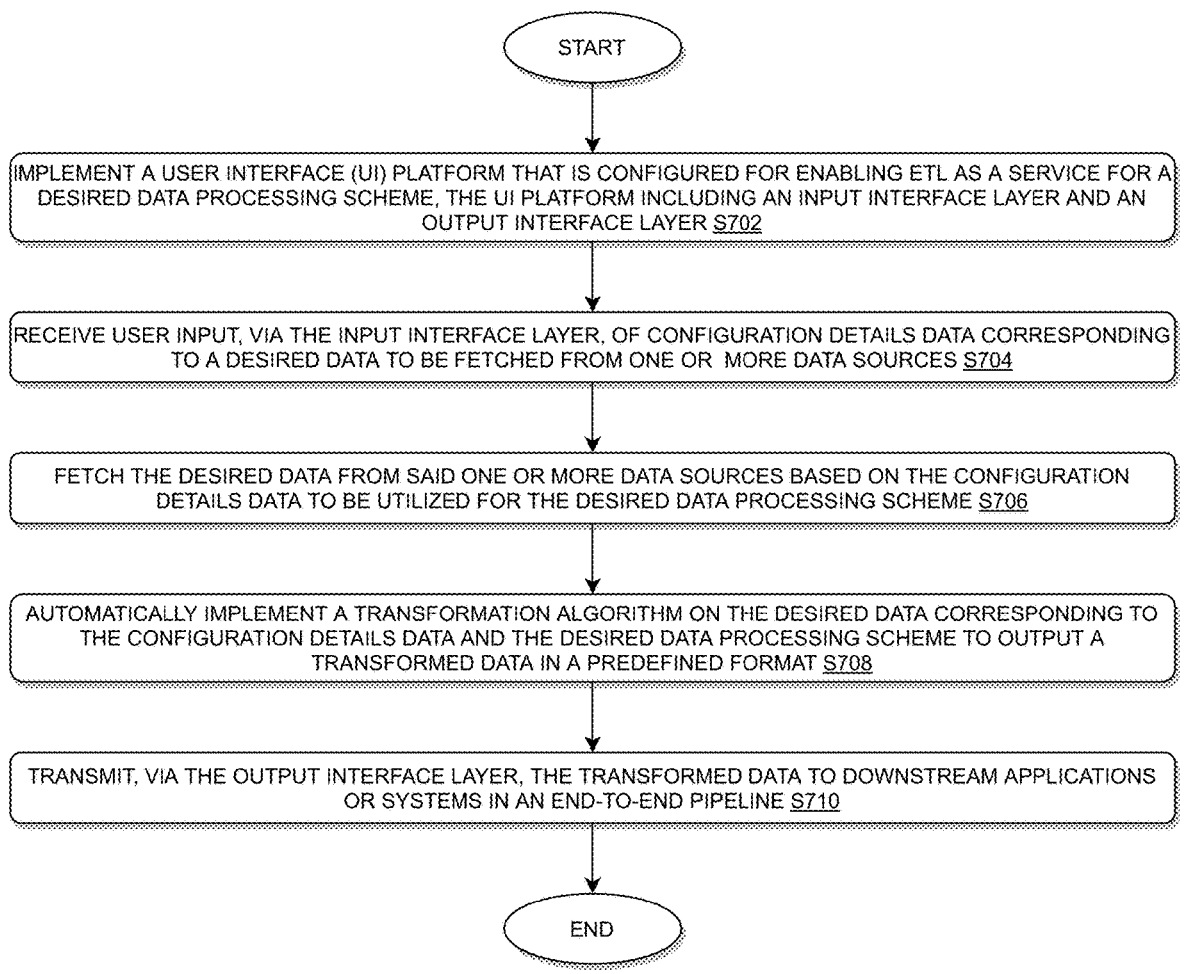
FIG. 7 illustrates a flow chart of implementing a cloud native ETL module for enabling ETL as a service for data processing in accordance with an exemplary embodiment.

FIG. 7 illustrates a flow chart of a process 700 implemented by the CNETLM 406 of FIG. 4 for enabling ETL as a service for data processing in accordance with an exemplary embodiment. It will be appreciated that the illustrated process 700 and associated steps may be performed in a different order, with illustrated steps omitted, with additional steps added, or with a combination of reordered, combined, omitted, or additional steps.

As illustrated in FIG. 7, at step 702, the process 700 may include implementing a user interface (UI) platform that is configured for enabling ETL as a service for a desired data processing scheme, the UI platform including an input interface layer and an output interface layer.

At step 704, the process 700 may include receiving user input, via the input interface layer, of configuration details data corresponding to a desired data to be fetched from one or more data sources.

At step 706, the process 700 may include fetching the desired data from said one or more data sources based on the configuration details data to be utilized for the desired data processing scheme.

At step 708, the process 700 may include automatically implementing a transformation algorithm on the desired data corresponding to the configuration details data and the desired data processing scheme to output a transformed data in a predefined format.

At step 710, the process 700 may include transmitting, via the output interface layer, the transformed data to downstream applications or systems in an end-to-end pipeline.

According to exemplary embodiments, in the process 700, the data processing scheme may include one or more of the processing schemes: real time data processing, stream data processing, and batch data processing, but the disclosure is not limited thereto.

According to exemplary embodiments, wherein in real time data processing, prior to transmitting the transformed data to downstream applications or systems, the process 700 may further implement one or more of the following processes to the fetched desired data: applying data augmentation or data enhancement algorithm; applying data normalization or data standardization algorithm; applying data validation algorithm; and applying business rules, but the disclosure is not limited thereto.

According exemplary embodiments, wherein in stream data processing, prior to transmitting the transformed data to downstream applications or systems, the process 700 may further implement one or more of the following processes to the fetched desired data: applying data aggregation, statistical calculations, and metrics computation algorithms over a predefined timed window; and applying micro-batching algorithm based on a predefined time or a predefined rate interval, but the disclosure is not limited thereto.

According to exemplary embodiments, wherein in batch data processing, prior to transmitting the transformed data to downstream applications or systems, the process 700 may further implement one or more of the following processes to the fetched desired data: applying data extraction, data transform, and data load algorithms; and applying database or schema migration algorithm, but the disclosure is not limited thereto.

According to exemplary embodiments, the process 700 may further include: identifying upstream applications or systems in the end-to-end pipeline that have moved onto a real time processing mode from a batch processing mode; identifying downstream applications or systems that are still working in a batch processing mode; and implementing a common configuration for interfacing the identified upstream applications or systems with the identified downstream applications or systems in a manner such that overall end-to-end pipeline remains intact during ETL.

According to exemplary embodiments, the process 700 may further include implementing a common code base for executing ETL across both the batch processing mode and the real time processing mode.

According to exemplary embodiments, the CNETLD 402 may include a memory (e.g., a memory 106 as illustrated in FIG. 1) which may be a non-transitory computer readable medium that may be configured to store instructions for implementing a CNETLM 406 for enabling ETL as a service for data processing as disclosed herein. The CNETLD 402 may also include a medium reader (e.g., a medium reader 112 as illustrated in FIG. 1) which may be configured to read any one or more sets of instructions, e.g., software, from any of the memories described herein. The instructions, when executed by a processor embedded within the CNETLM 406 or within the CNETLD 402, may be used to perform one or more of the methods and processes as described herein. In a particular embodiment, the instructions may reside completely, or at least partially, within the memory 106, the medium reader 112, and/or the processor 104 (see FIG. 1) during execution by the CNETLD 402.

According to exemplary embodiments, the instructions, when executed, may cause the processor 104 to perform the following: implementing a user interface (UI) platform that is configured for enabling ETL as a service for a desired data processing scheme, the UI platform including an input interface layer and an output interface layer; receiving user input, via the input interface layer, of configuration details data corresponding to a desired data to be fetched from one or more data sources; fetching the desired data from said one or more data sources based on the configuration details data to be utilized for the desired data processing scheme; automatically implementing a transformation algorithm on the desired data corresponding to the configuration details data and the desired data processing scheme to output a transformed data in a predefined format; and transmitting, via the output interface layer, the transformed data to downstream applications or systems in an end-to-end pipeline.

According to exemplary embodiments, wherein in real time data processing, prior to transmitting the transformed data to downstream applications or systems, the instructions, when executed, may cause the processor 104 to further implement one or more of the following processes to the fetched desired data: applying data augmentation or data enhancement algorithm; applying data normalization or data standardization algorithm; applying data validation algorithm; and applying business rules, but the disclosure is not limited thereto.

According to exemplary embodiments, wherein in stream data processing, prior to transmitting the transformed data to downstream applications or systems, the instructions, when executed, may cause the processor 104 to further implement one or more of the following processes to the fetched desired data: applying data aggregation, statistical calculations, and metrics computation algorithms over a predefined timed window; and applying micro-batching algorithm based on a predefined time or a predefined rate interval, but the disclosure is not limited thereto.

According to exemplary embodiments, wherein in batch data processing, prior to transmitting the transformed data to downstream applications or systems, the instructions, when executed, may cause the processor 104 to further implement one or more of the following processes to the fetched desired data: applying data extraction, data transform, and data load algorithms; and applying database or schema migration algorithm, but the disclosure is not limited thereto.

According to exemplary embodiments, the instructions, when executed, may cause the processor 104 to further perform the following: identifying upstream applications or systems in the end-to-end pipeline that have moved onto a real time processing mode from a batch processing mode; identifying downstream applications or systems that are still working in a batch processing mode; and implementing a common configuration for interfacing the identified upstream applications or systems with the identified downstream applications or systems in a manner such that overall end-to-end pipeline remains intact during ETL.

According to exemplary embodiments, the instructions, when executed, may cause the processor 104 to further implement a common code base for executing ETL across both the batch processing mode and the real time processing mode.

According to exemplary embodiments as disclosed above in FIGS. 1-7, technical improvements effected by the instant disclosure may include a platform for implementing a cloud native ETL module that serves as a cloud based alternative to traditional ETL/ELT tools provides ETL as a service for any potential end-user that possesses SQL (Structured Query Language) knowledge without the need to learn any other advanced programming languages or concepts, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for enabling ETL (Extract-Transform-Load) as a service for data processing by utilizing one or more processors and one or more memories, the method comprising:
    implementing a user interface (UI) platform that is configured for enabling ETL as a service for a desired data processing scheme, the UI platform including an input interface layer and an output interface layer;
    receiving user input, via the input interface layer, of configuration details data corresponding to a desired data to be fetched from one or more data sources;
    fetching the desired data from said one or more data sources based on the configuration details data to be utilized for the desired data processing scheme;
    automatically implementing a transformation algorithm on the desired data corresponding to the configuration details data and the desired data processing scheme to output a transformed data in a predefined format;
    transmitting, via the output interface layer, the transformed data to downstream applications or systems in an end-to-end pipeline;
    identifying upstream applications or systems in the end-to-end pipeline that have moved onto a real time processing mode from a batch processing mode;
    identifying downstream applications or systems that are still working in a batch processing mode;
    implementing a common configuration for interfacing the identified upstream applications or systems with the identified downstream applications or systems in a manner such that overall end-to-end pipeline remains intact during ETL; and
    implementing a common code base for executing ETL across both the batch processing mode and the real time processing mode.

2. The method according to claim 1, wherein the data processing scheme includes one or both of the processing schemes: real time data processing, and batch data processing.

3. The method according to claim 2, wherein in real time data processing, prior to transmitting the transformed data to downstream applications or systems, the method further comprising implementing one or more of the following processes to the fetched desired data: applying data augmentation or data enhancement algorithm; applying data normalization or data standardization algorithm; applying data validation algorithm; and applying business rules.

4. The method according to claim 2, wherein in batch data processing, prior to transmitting the transformed data to downstream applications or systems, the method further comprising implementing one or more of the following processes to the fetched desired data: applying data extraction, data transform, and data load algorithms; and applying database or schema migration algorithm.

5. A system for enabling ETL (Extract-Transform-Load) as a service for data processing, the system comprising:
    a processor; and
    a memory operatively connected to the processor via a communication interface, the memory storing computer readable instructions, when executed, causes the processor to:

implement a user interface (UI) platform that is configured for enabling ETL as a service for a desired data processing scheme, the UI platform including an input interface layer and an output interface layer;
receive user input, via the input interface layer, of configuration details data corresponding to a desired data to be fetched from one or more data sources;
fetch the desired data from said one or more data sources based on the configuration details data to be utilized for the desired data processing scheme;
automatically implement a transformation algorithm on the desired data corresponding to the configuration details data and the desired data processing scheme to output a transformed data in a predefined format;
transmit, via the output interface layer, the transformed data to downstream applications or systems in an end-to-end pipeline;
identify upstream applications or systems in the end-to-end pipeline that have moved onto a real time processing mode from a batch processing mode;
identify downstream applications or systems that are still working in a batch processing mode;
implement a common configuration for interfacing the identified upstream applications or systems with the identified downstream applications or systems in a manner such that overall end-to-end pipeline remains intact during ETL; and
implement a common code base for executing ETL across both the batch processing mode and the real time processing mode.

6. The system according to claim 5, wherein the data processing scheme includes one or both of the processing schemes: real time data processing, and batch data processing.

7. The system according to claim 6, wherein in real time data processing, prior to transmitting the transformed data to downstream applications or systems, the processor is further configured to implement one or more of the following processes to the fetched desired data: apply data augmentation or data enhancement algorithm; apply data normalization or data standardization algorithm; apply data validation algorithm; and apply business rules.

8. The system according to claim 6, wherein in batch data processing, prior to transmitting the transformed data to downstream applications or systems, the processor is further configured to implement one or more of the following processes to the fetched desired data:
apply data extraction, data transform, and data load algorithms; and apply database or schema migration algorithm.

9. A non-transitory computer readable medium configured to store instructions for enabling ETL (Extract-Transform-Load) as a service for data processing wherein, when executed, the instructions cause a processor to perform the following:

implementing a user interface (UI) platform that is configured for enabling ETL as a service for a desired data processing scheme, the UI platform including an input interface layer and an output interface layer;
receiving user input, via the input interface layer, of configuration details data corresponding to a desired data to be fetched from one or more data sources;
fetching the desired data from said one or more data sources based on the configuration details data to be utilized for the desired data processing scheme;
automatically implementing a transformation algorithm on the desired data corresponding to the configuration details data and the desired data processing scheme to output a transformed data in a predefined format;
transmitting, via the output interface layer, the transformed data to downstream applications or systems in an end-to-end pipeline;
identifying upstream applications or systems in the end-to-end pipeline that have moved onto a real time processing mode from a batch processing mode;
identifying downstream applications or systems that are still working in a batch processing mode;
implementing a common configuration for interfacing the identified upstream applications or systems with the identified downstream applications or systems in a manner such that overall end-to-end pipeline remains intact during ETL; and
implementing a common code base for executing ETL across both the batch processing mode and the real time processing mode.

10. The non-transitory computer readable medium according to claim 9, wherein the data processing scheme includes one or both of the processing schemes: real time data processing, and batch data processing.

11. The non-transitory computer readable medium according to claim 10, wherein in real time data processing, prior to transmitting the transformed data to downstream applications or systems, the instructions, when executed, cause the processor to implement one or more of the following processes to the fetched desired data: applying data augmentation or data enhancement algorithm; applying data normalization or data standardization algorithm; applying data validation algorithm; and applying business rules.

12. The non-transitory computer readable medium according to claim 10, wherein in batch data processing, prior to transmitting the transformed data to downstream applications or systems, the instructions, when executed, cause the processor to implement one or more of the following processes to the fetched desired data: applying data extraction, data transform, and data load algorithms; and applying database or schema migration algorithm.

* * * * *